United States Patent [19]

Burks

[11] 4,049,154

[45] Sept. 20, 1977

[54] VENDING MACHINE WITH TIERED TURN TABLE CONSTRUCTION

[75] Inventor: Howard L. Burks, Dunedin, Fla.

[73] Assignee: Perino B. Wingfield, Yellow Springs, Ohio ; a part interest

[21] Appl. No.: 664,747

[22] Filed: Mar. 8, 1976

[51] Int. Cl.[2] .............................................. B65G 1/06
[52] U.S. Cl. ...................................... 221/76; 221/120
[58] Field of Search ................. 221/76, 120, 155, 241, 221/105, 104; 194/10, 2; 312/135, 305, DIG. 25, 125

[56] References Cited

U.S. PATENT DOCUMENTS

| | | | |
|---|---|---|---|
| 1,059,781 | 4/1913 | Stephen | 312/125 X |
| 2,529,960 | 11/1950 | Pelletier | 312/305 |
| 2,678,251 | 5/1954 | Stewart | 221/76 X |
| 3,146,043 | 8/1964 | Johnson et al. | 221/76 X |
| 3,942,647 | 3/1976 | Crosslen | 312/125 X |

*Primary Examiner*—Stanley H. Tollberg
*Attorney, Agent, or Firm*—Jerome P. Bloom

[57] ABSTRACT

A vending or dispensing type machine featuring a turntable with a tiered superstructure embodying receptacles for articles to be dispensed. The superstructure is formed in segments which can be quickly and readily assembled per se and then easily joined, concentric to and in connection with a vertically oriented drive shaft.

The machine also features simplified controls providing that each of the respective tiers of receptacles are automatically provided with a dispensing station at its own level as the receptacles of the other tiers are sealed from access.

14 Claims, 7 Drawing Figures

VENDING MACHINE WITH TIERED TURN TABLE CONSTRUCTION

BACKGROUND OF THE INVENTION

The present invention relates to the simplification of the construction of vending and dispensing machines so as to make their components more economical to fabricate, more efficient and satisfactory in use, unlikely to malfunction and easy to maintain.

Vending machine construction has been highly diversified. In the prior art the means and mode of their construction and assembly has constantly shifted and changed. The reason for this is the fact that no fully satisfactory machine has been yet contrived. The machines of the prior art are often too complex and expensive in their construction and in many cases very difficult to service. If they have been economically fabricated they have normally not lasted and they have required constant attention and repair. It is to such problems as this that the solution of the present invention is directed.

SUMMARY OF THE INVENTION

In preferred embodiment, the invention provides a vending or like machine featuring a tiered turntable structure formed in segments which are readily joined to and about a motor driven shaft. The segments are uniquely comprised of channel shaped elements which are vertically oriented and have their open ends capped by upper and lower plates. Simply applied plate-like inserts divide the outwardly opening cavity formed by each channel shaped element into a plurality of vertically superposed receptacles the sides of which diverge as they open outwardly from the segment and the tiered turntable structure of which they form a part.

In the turntable construction the channel shaped elements are circularly and equidistantly spaced and the spaces therebetween are converted into further stacked receptacles by simple horizontally applied plate-like inserts.

Preferred embodiments feature a housing incorporating dispensing stations defined by openings which are vertically stacked, there being one of such openings for each tier of the turntable structure. All except one of these openings or stations are normally closed by doors which are caused to automatically shift to close the opening or station aligning with a tier the receptacles of which have just been emptied and to open the station aligning with receptacles in the next tier from which articles are to be next dispensed.

Not only is the physical construction of the turntable and the means providing access to the tiers of receptacles uniquely and economically contrived but the controls therefor are incorporated in an equally simple manner.

It is accordingly a primary object of the invention to provide apparatus for a vending or like machine which is economically fabricated, most effective and satisfactory in use and essential trouble free in operation.

A further object of the invention is to provide a tiered turntable structure for a vending or dispensing machine formed in segments which may be simply joined, which segments are contrived of inexpensive sheet metal elements which may be slip fit and interconnected to provide a plurality of receptacles disposed in a circular tiered fashion.

Another object of the invention is to provide simplified controls for operating a turntable type dispensing structure characterized by receptacles disposed in a circular tiered arrangement featuring means for automatically shifting the level of the dispensing station for the articles which have been inserted in said receptacles.

An additional object of the invention is to provide vending and dispensing apparatus possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein one but not necessarily the only form of the embodiment of the invention is illustrated, FIG. 1 is a perspective view of a vending machine in accordance with the invention showing the service door open for access to all of the receptacles of a tiered turntable which is provided interiorly thereof and the dispensing stations for the respective tiers of the receptacles;

Like parts are designated by like numerals throughout the several views of the accompanying drawings.

Figure 1:
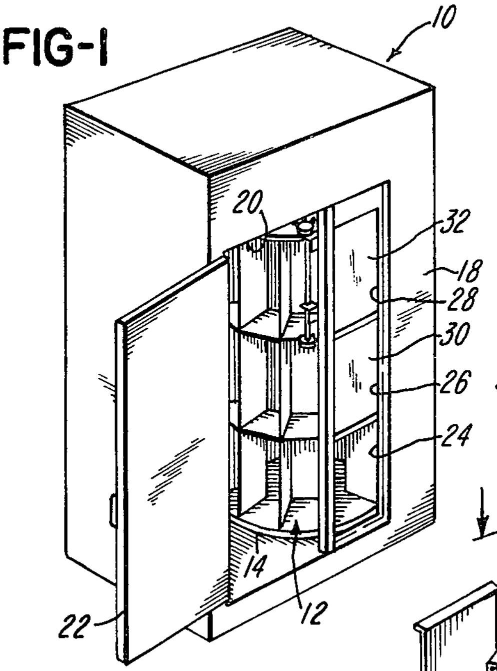
Figure 2:
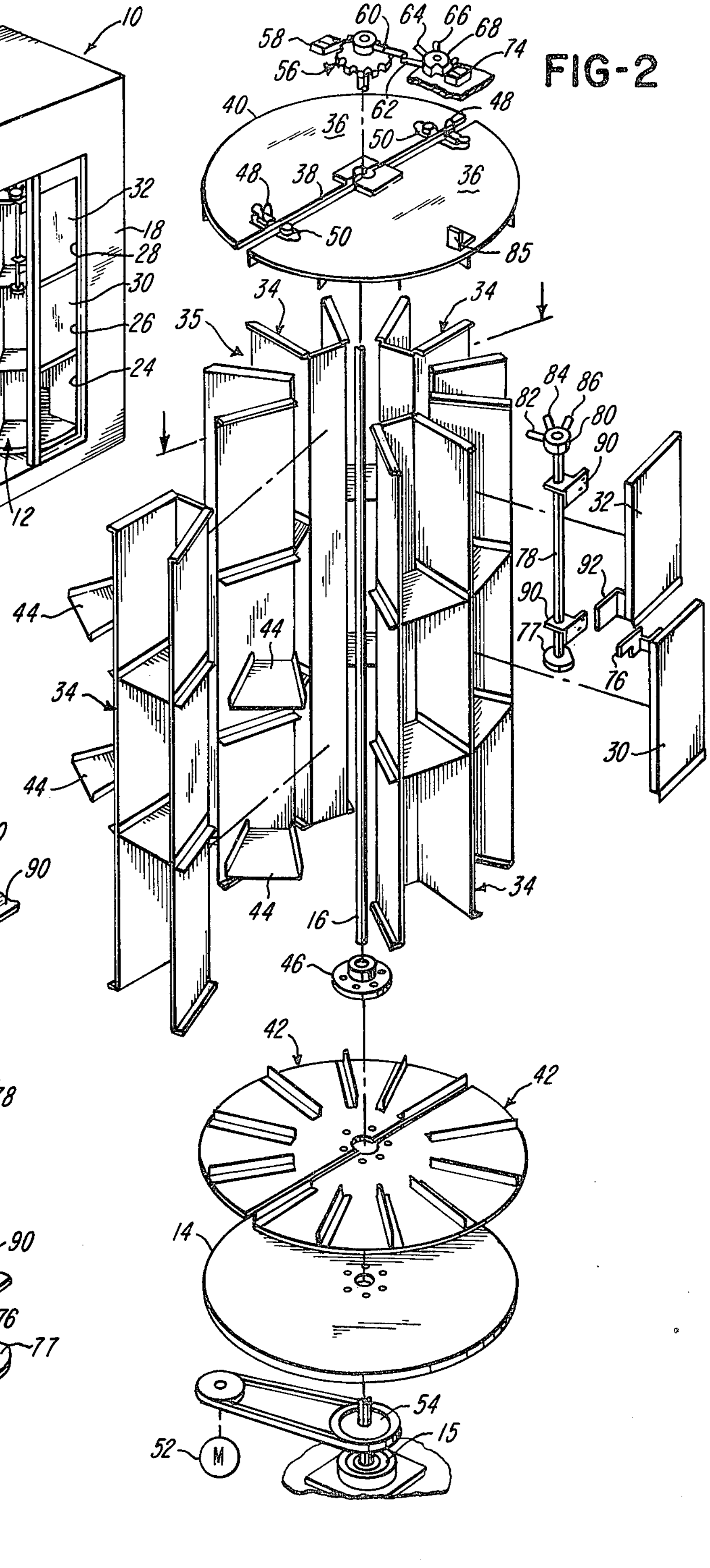
FIG. 2 is an exploded view of the tiered turntable construction and illustrates associated controls in a diagrammatical fashion.

The embodiment here illustrated has particular advantage when used to dispense bags of ice. However, it will be obvious therefrom that the novel construction and principles involved are readily adaptable to provide for their use in fabricating similar apparatus which may be applied to the dispensing of a great variety of articles. It is to be also understood that elements of the controls herein shown and described are in the main only diagrammatically illustrated and only to the extent necessary for an understanding of the improvements of the present invention. Moreover, there is no detail or description of obvious and known elements of such controls or related circuitry as are well known and easily contrived and understood by those mechanics versed in the art. This procedure is followed to avoid a clouding of the true features and elements of the present invention.

The embodiment of the invention illustrated, which may be used, for example, as an ice vending machine, comprises a housing 10 for a tiered turntable type superstructure 12 mounted on a plate-like disc shaped base 14. Extending vertically from the bearing 15 fixed on the base on the interior of the housing 10 is a drive shaft 16. The latter projects through the center of the base 14 and, as will be described, is connected in driving relation thereto and to the superstructure 12. As will be seen, the shaft 16, as it projects upwardly, forms the longitudinal vertical axis of the superstructure 12.

Oriented in vertical stacked relation in the front wall 18 of the housing 10, to one side of a service opening 20 which is closed by a door 22, are three rectangular openings which, from bottom to top, are numbered 24, 26, and 28. These openings provide dispensing stations. In the fully loaded condition of the superstructure 12 the upper openings 26 and 28 are respectively sealed by doors 30 and 32.

As shown, the superstructure 12, the outer periphery of which has a generally cylindrical configuration, is vertically split and formed in two half sections. Each half section is comprised of three channel shaped elements 34 of each half section which are vertically oriented. The elements 34 are capped at their open upper ends by a plate segment 36 having a straight edge 38 and an arcuate edge 40 defining its peripheral configuration, the arcuate edge portion of which is formed on an uniform radius. The lower open ends of the elements 34 embodied in each half section of the superstructure are capped by a plate segment 42 the shape of which is identical to that of the plate segment 36 and in direct vertical alignment therewith. It will be seen from the foregoing that each of the segments 36 and 42 have a semicircular peripheral configuration.

In transverse section, each of the channel shaped elements 34 have the shape of a truncated "V", the divergent extremities of which lies in vertical lines including points of the arcuate edges of the top and bottom plate segments 36 and 42. In the case of each element 34 the sides of the truncated V project radially of the plate segments 36 and 42 and their innermost ends are bridged by the truncated portion of the V at a location spaced radially outward of the centers of the straight edges of the connected plate segments.

As here provided each half of the superstructure has a hemi-cylindrical outer peripheral configuration and the channel shaped elements 34 thereof open outwardly of their outer arcuate faces in a circularly and equidistantly spaced relation.

The elements 34 may be cheaply and easily formed of sections of sheet metal, readily bent to the desired configuration. For application to the respective top and bottom plate segments 36 and 42, the respective extremities of the elements 34, which are originally made longer than required, are bent outwardly and appropriately notched to form flanges which are abutted to and suitably secured to the capping plate segments which form their ends, utilizing any one of a number of obvious, inexpensive, connecting means.

To form receptacles, the channels of the elements 34 are bridged at each of a plurality of vertically spaced intervals by a wedge shaped plate like insert 44. Each insert 44 is horizontally oriented and is shaped to be complementary to the shape of the transverse section of the channel which it bridges. It is cut from sheet metal and formed to include dependent flanges at its sides. The latter abut and are fixed to the respective divergent sides of the element 34 in which the insert is applied. Again, the connection of the flanges may be simply achieved utilizing conventional and inexpensive means.

In the example illustrated the superstructure 12 embodies six channel formed elements 34, there being three in each half of the superstructure. Correspondingly, since the elements 34 are circularly and equidistantly spaced, there will be three equidistantly separated spaces 35 defined at the outer peripheral portion of each half of the superstructure. As arranged, this provides that the outer side of one element 34 will be in vertical alignment with a portion of the straight edge of the superstructure half of which it forms a part, at one end thereof. The remote element 34 of the superstructure half will be separated from the opposite end of the same straight edge, in a circular sense, by a space 35. Inserts 44 are also applied at vertically spaced intervals in each of the spaces 35. Where the space 35 is bounded by adjacent sides of channel formed elements 34, the side flanges in the inserts 44 will be fixed to such respectively adjacent sides. In the case where the inserts 44 are positioned to bridge the space 35 bounded on one side only by a channel formed element 34, they will be secured to that element only, in a fashion to project horizontally in a firm and stabilized manner, positioning their free flanges in a plane commonly occupied by the straight edge boundary of the superstructure half.

Note from the drawings that each of the top and bottom segments 36 and 42 are notched at the centers of their straight edges to enable the identically constructed half sections of the superstructure 12 to have their straight edges brought together about the drive shaft 16. In the process the bottom plate segments 42 are seated to the upper surface of the base 14. A flanged collar element 46 which has previously been slipped over the shaft 16 is then superposed over central portions of the abutting mating straight edges of the bottom plate segments 42. Bolts or similar connecting elements are then projected through aligned apertures in the flange of the collar 46, the plates 42 and the base 14. In this manner the base of the tiered superstructure 12 is fixed for rotation with the turntable base 14 which has been suitably secured to and for rotation with the shaft 16.

At the top of the superstructure 12 the mating straight edge portions of the plate segments 36 are provided with the respective cooperating portions of a trunk type latch means, one portion 48 of which provides a loop element which may be dropped over a second portion 50 which has a projected stud like form. Portion 50 has a recess in the side thereof remote from the loop portion into which its projected extremity may be wedged by the manipulation of a conventional lever like attachment in connection with and forming part of the loop portion 48. It is believed that latch means of the type described are so well known as not to require any detailed showing or description. The point is that the assembly of superstructure 12 is simply completed by a simple latching together of the plate segments 36 in a co-planar relation.

It will be understood that in the assembly of the inserts 44 they not only define vertically stacked receptacles but they are so positioned in both the channels of the elements 34 and in the spaces 35 that in the composite superstructure they provide circular arrangements of receptacles which open outwardly at each of three levels in the superstructure. The inserts 44 which define the base plane of each of the three levels or tiers are arranged to lie in a plane commonly occupied by the means defining the lower edge of one of the openings 24, 26, and 28 which provide the vertically stacked dispensing stations in the housing 10.

While here illustrated to provide twelve vertical stacks of receptacles, the capacity of the superstructure can obviously be changed by changing the number and spacing of the elements 34. Moreover, by varying the number and spacing of inserts 44 one can change the number of tiers of receptacles embodied in the superstructure. Likewise, though not recommended, the superstructure may obviously be originally fabricated of more than two vertical segments.

In the example illustrated, there is a diagrammatic showing of a motor 52 drivingly related to the shaft 16 by means of an assembly comprised of pulleys and an interconnecting drive belt. It is contemplated that the motor 52 will be conventionally embodied in a circuit so that it may be energized through the medium of a dropping of a coin or coins in a meter attached to a vending machine. As will be obvious, an energizing of the motor 52 will initiate a drive of the shaft 16 and a rotation of the superstructure 12 about its vertical axis. While it may be connected to an upper or lower projected end portion of shaft 16, a timing sprocket 56 is shown, diagrammatically, to be attached to an upper end portion of the shaft. In this example sprocket 56 is provided with twelve equidistantly spaced teeth, one for each vertical stack of receptacles. In bearing engagement with the outer peripheral edge of sprocket 56 is the operating arm 57 of a switch 58. Switch 58 will be incorporated in the energizing circuit of the motor 52 so as to open this circuit each time a receptacle in a vertical tier following that then at the dispensing station is brought into line with the dispensing station. Of course, in the first instance the dispensing station will be the opening 24. It will be understood that in its function the motor 52 will have the energizing circuit thereof closed by the dropping of the appropriate coins in the related meter whereupon it will step the shaft 16 from a static position, an increment of rotation sufficient to move the superstructure 12 to bring the next receptacle, in a rotary sense, to the dispensing station, at which time the sprocket 56 will have turned an increment sufficient to cause the operating arm 57 of switch 58 to open the motor circuit and stop the motor 52. As is well known to those versed in the art, the switch 58 may be chosen to provide that the opening of the circuit of motor 52 will occur when the arm 57 is either moved out onto a tooth of the sprocket 56 or into the space between successive teeth of the sprocket 56. As noted previously, since the wiring of the necessary circuitry will be well understood by a mechanic versed in the electrical art, neither a detailed showing or description thereof appears necessary.

In connection with the hub of the sprocket 56 is a radially directed arm 60 which projects beyond the peripheral edge of the sprocket and into a path occupied by one (62) of three spoke-like projections 62, 64 and 66 from a sleeve-like collar 68. The collar 68 mounts for rotation about a stud 70 fixed parallel to shaft 16 and to a suitable base connected with the housing 10. The projections 62, 64 and 66 are suitably spaced about a peripheral portion of collar 68, and spaced circumferentially therefrom the outer periphery of collar 68 has a notch 72. Fixed adjacent the collar 68 is a switch 74 the operating element 73 of which bears on the outer peripheral surface of the collar. In this position of element 73 switch 74 is normally closed and opened only when the collar 68 is rotated sufficiently to permit the projected end of element 73 to drop into the notch 72. As will be described the element 73 will in this position signal that all the receptacles in the superstructure are empty.

Figure 3:
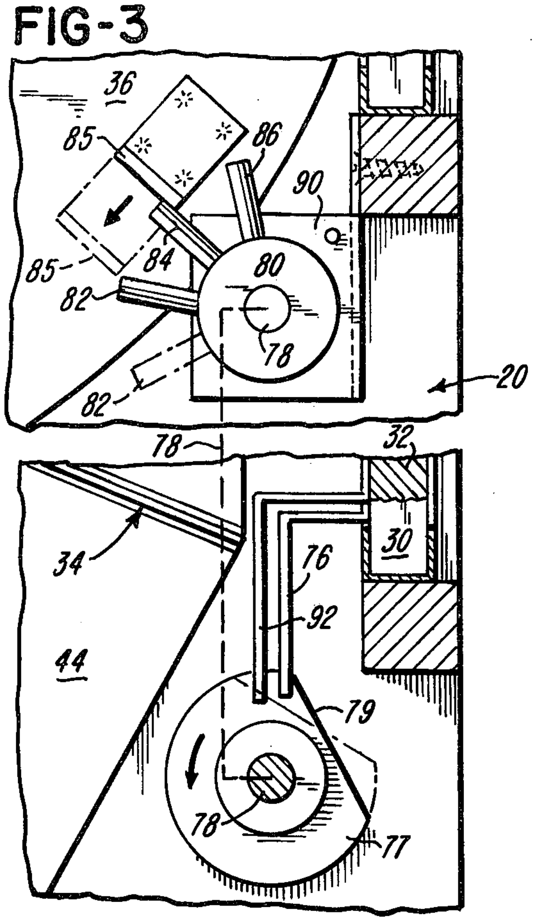
FIG. 3 is a fragmentary view showing the control means for the doors arranged in the vending machine housing to cap all but the one of its dispensing stations which is then in use.
Figure 6:
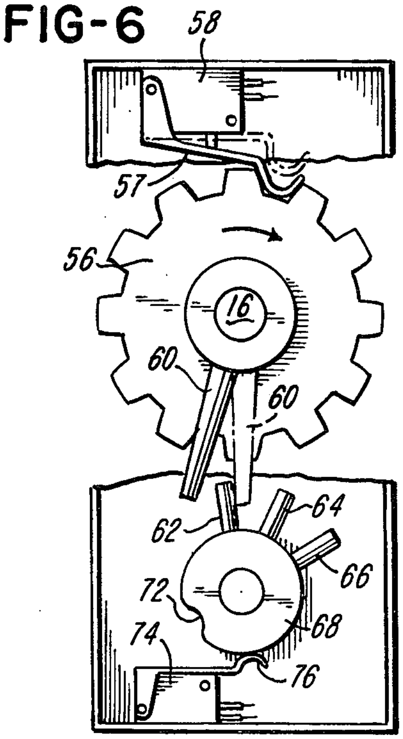
FIGS. 6 and 7 are diagrammatic and fragmentary illustrations of further control features of the illustrated embodiment of the invention.
Figure 7:
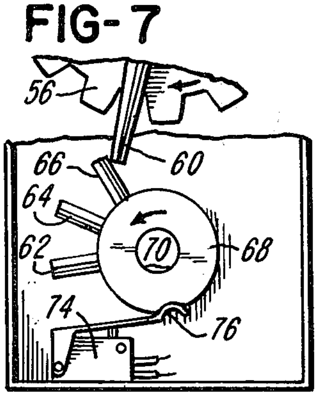

As previously mentioned, in a fully loaded condition of the receptacles of the superstructure 12, doors 30 and 32 will seal the openings 26 and 28 which respectively provide dispensing stations for the second and third tier of receptacles. At the upper end thereof, at its left edge as seen in the drawings, door 30 has in connection therewith and laterally projected therefrom, in an offset relation, a plate-like arm 76. With the door 30 in position to close opening 26, the narrow bottom edge of arm 76 seats on a radially projected plate portion 77 on the lower end of a vertically oriented shaft 78. The upper end of shaft 78 mounts a fixedly connected collar 80 which mounts in turn three spoke-like projections 82, 84 and 86 which are circumferentially spaced. In FIG. 3 the spoke 84 is shown to position in the path of a vertically projected plate segment 85 fixed to the top of a plate segment 36. This last will occur at that point in time when the last receptacle in the lower tier thereof to contain an article to be dispensed is aligned with the opening 24.

The indexing plate segment 85 is oriented radially of the top of the superstructure 12 adjacent its outer peripheral edge. Note that the shaft 78 is suitably supported for rotation in vertically spaced brackets 90 fixed to the interior wall of housing 10 adjacent its service opening 20. Door 32 includes a laterally offset plate-like arm 92 at its lower edge, the outer offset portion of which projects in a sense parallel to the arm 76. The narrow bottom edge of the projected extremity of arm 92 also seats on the plate portion 77 when the door 32 is positioned to close the opening 28. It will be seen from FIG. 3 that the projected extremities of arms 76 and 92 are circularly offset as they bear on the upper surface of plate 77. The latter has a peripheral portion thereof particularly cut at 79 to provide that on a first stepping of the shaft 78 by engagement of the element 85 with spoke 82 projected from collar 80 (FIG. 4) arm 76 will not clear plate 77. As will be obvious, a successive indexing of the shaft 78 by the element 85 engaging the spokes 84 and 86 will cause plate 77 to first clear arm 76 and then clear the arm 92. This successive indexing of the shaft 78 will first provide that the door 30 will drop to open the station 26 and close the station 24 and then provide for the door 32 to drop and close the station 26 and open the station 28.

The full significance of the above described structure will be seen from the following description of its operation.

Figure 4:
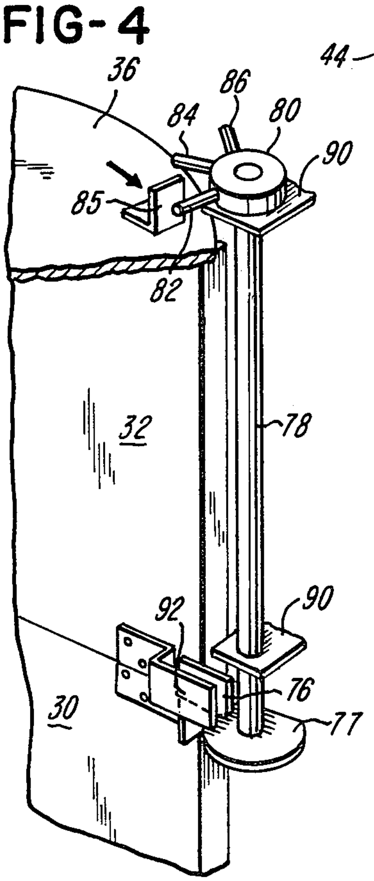
FIG. 4 illustrates further details of the control means portions of which are diagrammatically illustrated in FIG. 3.
Figure 5:
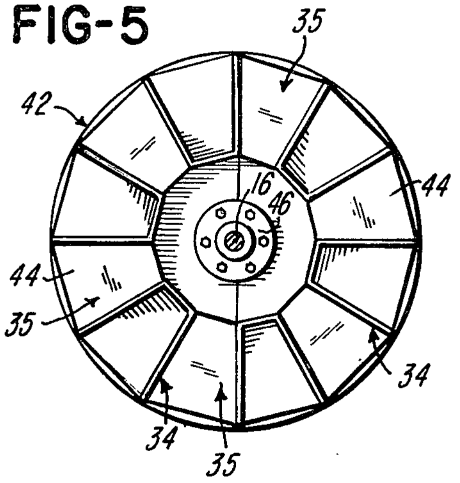
FIG. 5 is a view taken on line 5—5 of FIG. 2.

In use of the apparatus, the receptacles of the three tiers of superstructure 12 will be loaded with articles to be dispensed, bags of ice in the case mentioned. Once loaded, the superstructure 12 will be positioned to place a vertical stack of receptacles opposite openings 24, 26 and 28, 26 and 28 of which are then sealed by doors 30 and 32. Under normal circumstances housing 10 will be provided with an additional door (not shown) covering the dispensing stations, which door will be automatically locked until released by the deposit of the suitable purchase price in the coin meter used with the vending machine. At this point the station 24 is open to one of the receptacles in the lower tier and the plate projection 85 will be positioned as shown in FIG. 4 just before, in a rotative sense, the spoke 82 in connection with the collar 80 fixed to the shaft 78. At this point also, the arms 76 and 92 of doors 30 and 32 will be supported by the plate portion 77 in connection with shaft 78, switch 58 will be in a closed position as will switch 74 and the apparatus is ready for a complete course of operation.

To obtain an article from a receptacle, the necessary coin or coins must be dropped in the controlling meter.

As previously mentioned, this will close appropriate switches energizing the motor 52 which will index the shaft 16 by rotating the same an increment sufficient to bring the receptacle next following that at the opening 24 into alignment with this opening. This is signalled by the sprocket 56 moving an increment sufficient to position the operating element 57 to open the switch 58 and thereby open the motor circuit. The said next following receptacle of the lower tier is then stopped in direct alignment with the lower dispensing station. The circuitry provided will at this time release the lock of the outer door (not shown) which may be opened by the customer to obtain the article purchased. This outer door will be spring biased to automatically close and set the related switch, absent which it will not be possible to purchase the next article. It is emphasized that conventional details of the circuitry provided for this purpose are not shown or described since they form no particular part of the present invention. The same operation is a consequence of the deposit of coins to purchase the successive articles loaded in the successive receptacles of the first tier. When the coins are deposited to purchase the article in the last of the filled receptacles in the first tier, the difference is that it will result in the first tier being completely empty. Accordingly, in order to commence sale of articles from the second tier it will be necessary to induce the door 30 to drop.

Thus, upon insertion of the next coins for an energizing of the motor 52 one will find that the plate-like element 85 will be positioned immediately behind the spoke 84 in its path, the superstructure 12 having been rotated 360° in emptying the receptacles of the lower tier. In the stepping movement of the shaft 16 the plate 85 will move the spoke 84, rotating the shaft 78 and the plate 77 to clear the arm 76 of door 30. The latter will then drop to close the opening 24 and provide an open dispensing station at 26. Of course, with the first 360° revolution of the superstructure 12 the collar 68 will have been indexed similarly to the shaft 78 by an engagement of the spoke 62 for rotation thereof by the arm 60 connected with the shaft 16. At this point, the switch 74 will not be affected. As door 30 drops, a receptacle of the second tier the article of which is to be first dispensed will be brought into alignment with the opening 26. The circuitry provided will function otherwise, in each cycle thereof for dispensing articles from the second tier, as previously described.

As will be obvious, the procedure for moving from the second to the third tier is the same as before. In process of initiating the third revolution of the superstructure 12, plate 85 will engage the spoke 86 then in its path to rotate shaft 78 and plate 77 to clear the arm 92 whereby to drop the door 32 to cap opening 26 and open the dispensing station for the third tier at 28. The collar 68 will simultaneously be indexed by engagement of the spoke 64 and the rotation thereof by the arm 60 in connection with the sprocket 56, producing no change in the condition of the switch 74. This places the spoke 66 in the path of the arm 60 so that on the completion of the third revolution of superstructure 12 it will be indexed sufficiently to provide for the operating arm 73 to be biased into the notch 72 in collar 68 whereupon to signal that all of the receptacles have been emptied.

It will be realized, of course, that the spokes 82, 84 and 86 in the one instance and 62, 64 and 66 in the other, will be appropriately spaced so as to have their function utilized at the precise time required in the operation of the apparatus.

From the above description it will be apparent that there is thus provided a device of the character described possessing the particular features of advantage before enumerated as desirable, but which obviously is susceptible of modification in its form, proportions, detail construction and arrangement of parts without departing from the principle involved or scarificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. For use in a vending or like machine, a tiered turntable type structure providing receptacles for articles to be vended or dispensed comprising upper and lower plates spaced apart by channel shaped elements providing vertically orienting channels the sides of which are bridged by means providing horizontal partitions dividing said channels into a vertical series of said receptacles, said channel shaped elements being circularly spaced, at least in part, and the vertical spaces thereby provided between said upper and lower plates and between adjacent of said channel shaped elements which are circularly spaced being similarly bridged by horizontal partition means to form an additional vertical series of receptacles, said upper and lower plates being each comprised of a plurality of plate segments the mating of which produces a composite structure having a circularly configured periphery, each of said upper plate segments being paired with a lower of said plate segments by a plurality of said channel shaped elements which extend therebetween to form therewith a separable section of said tiered turntable structure, said structure being made up of mating separable sections each comprising plural vertical series of receptacles and each being formed by an upper and a lower plate segment and a plurality of interconnecting channel shaped elements.

2. Apparatus as in claim 1 characterized in that said sectioned tiered structure is releasably connected for rotation with a vertically positioned motor driven shaft having in association therewith means to step said shaft and said structure an increment of rotation to successively present at least one of said receptacles in a position to align with a dispensing station.

3. Apparatus as in claim 1, wherein means are provided for releasably latching said sections in a mating relation.

4. Apparatus as in claim 1 characterized in that said structure is mounted for rotation with and about the axis of a rotatable shaft which has in operative connection therewith means for interrupting its rotation as said tiered turn table structure is moved an increment sufficient to move a receptacle in a tier thereof from a position adjacent and displaced from a dispensing station to a position in alignment with said station and means are operatively related to provide for a shifting of said station from one tier to another of said structure.

5. Apparatus as in claim 2 characterized in that a housing is provided for said tiered structure incorporating means defining a plurality of said dispensing stations arranged to align with a vertical series of said receptacles and means are provided to maintain all but one of said stations in a sealed condition, said means being under the control of said turntable structure in the stepping thereof with said shaft to provide for successive stations to be opened on each substantially 360° rotation of said turntable structure.

6. For use in a vending or like machine, a tiered turntable type structure providing receptacles for articles to be vended or dispensed comprising upper and lower plates spaced by channel shaped elements orienting to define vertical channels and circularly arranged to at least in part define spaces therebetween, means bridging the sides of said channel shaped elements in said channels and in the spaces therebetween forming vertically spaced horizontal partitions cooperating with said channel shaped elements mutually to define at least three tiers of circularly arranged receptacles opening outwardly of said tiered turntable structure, said tiered structure being releasably connected for rotation with a vertically positioned motor driven shaft having in association therewith means to step said shaft and said structure an increment of rotation to successively present at least one of said receptacles in a position to align with a dispensing station, a housing provided for said tiered structure incorporating means defining a plurality of said dispensing stations arranged to align with a vertical stack of said tiered receptacles and incorporating means provided to maintain all but one of said stations in a sealed condition, said dispensing stations being provided by openings in said housing and all but the lower of said openings being normally sealed in commencing with the use of said apparatus, by door elements included in said means provided to maintain all but one of said stations in a sealed condition, and means being provided to function subsequent to an emptying of the receptacles in the lower tier to induce a shifting of the door element sealing the next higher tier dispensing station to move to close the dispensing station of the lower tier and open that of the next higher tier.

7. Apparatus as in claim 6 characterized in that said door elements are originally retained in their respective sealing positions covering the dispensing stations for the upper of said tiers of receptacles by having means projected therefrom bearing on means operatively connected for rotation with a further shaft and said further shaft has means operatively related to said tiered structure to be indexed thereby and provide for successive shifting of said door elements to close the dispensing station of each tier of receptacles the contents of which have been dispensed and to provide for the opening of the dispensing station of the next tier of receptacles, as a signal is given to present a first of said receptacles the contents of which are to vended from said next tier.

8. Vending machine apparatus comprising a tiered turntable embodying tiers of receptacles, in each tier of which the receptacles are arranged in a circular pattern to open outwardly therefrom, and a housing for said structure embodying means defining a plurality of dispensing stations vertically stacked to align with respective tiers of receptacles, means being included to seal all but one dispensing station having means operatively related thereto controlled by a rotary movement of said structure including said tiers of receptacles following the emptying of the receptacles of a tier to cause a shifting of a portion of said sealing means to open the dispensing station at a tier the receptacles of which are next required to have their contents dispensed, said turntable being mounted for rotation about a vertical axis and having means connected thereto for inducing successive increments of rotation thereof to successively present the receptacles therein to a dispensing station, said shifting means including a rotatable shaft arranged to be indexed by said tiered turntable structure upon a substantially 360° rotation thereof and said shaft having in connection therewith means to support the respective sealing means which are in the form of doors capping openings in said housing which provide said dispensing stations, said supporting means being arranged to successively release said doors following each substantially 360° revolution of said tiered turntable structure to provide for a seal of the dispensing station at a tier including receptacles the contents of which have just been dispensed and an opening of the dispensing station at a tier the contents of the receptacles of which are next required to be dispensed.

9. Apparatus as in claim 8 characterized in that said turntable structure has connected for rotation therewith a radially oriented element operatively associated with an indexing means and switching means embodied in a circuit for rotating said tiered turntable structure and characterized in that said radially oriented element is arranged to successively index said indexing means associated therewith on each rotation thereof to cause the related switching means to signal the emptying of all said receptacles in said turntable structure.

10. Vending machine apparatus comprising a cylindrical structure providing multiple tiers of dispensing pockets including a plurality of elongated members each of which defines a vertically orienting channel, said members being circularly arranged, with at least some of the adjacent thereof in a circularly spaced apart relation, and oriented to have their open sides facing outwardly of said cylindrical structure, plate means uniting said members at opposite ends thereof, plate-like inserts positioned within said channels and between the adjacent of said members which are circularly spaced so as to be horizontally diposed and to form thereby a plurality of tiers of dispensing pockets in each of which tiers there is a plurality of said pockets, means defining a base for said cylindrical structure which is mounted for rotation about a substantially vertical axis, a housing enclosing said cylindrical structure and providing therefor a series of dispensing stations including one for each tier of said pockets, means in operative connection with said base and said cylindrical structure for the rotation thereof in step by step fashion to successively present the dispensing pockets in each tier of said cylindrical structure to the related dispensing station and means including independently operable doors for controlling access to respective tiers of said dispensing pockets by way of said dispensing stations in correspondence with and in response to a predetermined degree of rotation of said cylindrical structure, the respective positions of said doors being determined by means indexed under the influence of means in connection with said cylindrical structure and in correspondence with a predetermined degree of rotation of said cylindrical structure.

11. Vending machine apparatus as set forth in claim 10 wherein said cylindrical structure is comprised of a plurality of vertical sections each of which is comprised of an upper and a lower segment of said plate means interconnected by a plurality of said channel defining members and said sections of said cylindrical structure are releasably coupled to one another and releasably connected with said base.

12. Vending machine apparatus as set forth in claim 11 wherein said sections of said cylindrical structure comprise a pair of generally semi-cylindrical sections which in the releasable coupling thereof to form said cylindrical structure define a central passage the length thereof accommodating the projection therethrough of a shaft in connection with and extending perpendicular to said base, said shaft providing a drive element for said base to which said cylindrical structure is releasably fixed and said shaft is operatively related to control means providing for a predetermined increment of rotation of said base and said cylindrical structure each time said shaft is energized whereby to provide that access may be had to only one of said dispensing pockets through one of said dispensing stations at any one time.

13. Vending machine apparatus including a rotatable structure embodying a plurality of dispensing receptacles arranged in a plurality of vertically positioning tiers each comprising a plurality of said receptacles, a housing enclosing said rotatable structure and having an apertured portion providing a generally vertical series of dispensing stations allowing access to the receptacles of respective tiers, means for rotating said tiered structure in step by step fashion to bring corresponding receptacles of each tier to said apertured portion of said housing in successive fashion, a lowermost one of said dispensing stations at said apertured portion of said housing being normally open for access therethrough to the receptacles of a lowermost tier, doors closing upper dispensing stations, and means responsive to rotation of said rotatable structure for opening successive doors of said upper stations beginning with the station immediately adjacent said lowermost station and continuing to the uppermost one of said stations.

14. Vending machine apparatus as in claim 13, wherein said doors open by dropping from a position closing one dispensing station to a position opening said one station and closing a next lower station, said means responsive to rotation of said rotatable structure including mechanism performing indexing movements responsively to rotation of said rotatable structure, and door supports successively released by said indexing mechanism.

* * * * *

UNITED STATES PATENT OFFICE

CERTIFICATE OF CORRECTION

Patent No. 4,049,154 Dated September 20, 1977

Inventor(s) Howard L. Burks

It is certified that error appears in the above-identified patent and that said Letters Patent are hereby corrected as shown below:

Column 8, line 7, "scarificing" should read -- sacrificing --.

Signed and Sealed this

*Twenty-fourth* Day of *January 1978*

[SEAL]

*Attest:*

RUTH C. MASON
*Attesting Officer*

LUTRELLE F. PARKER
*Acting Commissioner of Patents and Trademark*

UNITED STATES PATENT OFFICE

CERTIFICATE OF CORRECTION

Patent No. 4,049,154 Dated September 20, 1977

Inventor(s) Howard L. Burks

It is certified that error appears in the above-identified patent and that said Letters Patent are hereby corrected as shown below:

Column 3, line 17, delete "of each half section".

Column 3, line 18, after "34" to read -- of each half section --.

Signed and Sealed this

*Twelfth* Day of *September 1978*

[SEAL]

*Attest:*

RUTH C. MASON
*Attesting Officer*

DONALD W. BANNER
*Commissioner of Patents and Trademarks*